United States Patent
Suzuki

(12) 
(10) Patent No.: US 6,385,002 B1
(45) Date of Patent: May 7, 2002

(54) PICKER MECHANISM FOR A RECORDING MEDIUM LIBRARY

(75) Inventor: Takeshi Suzuki, Yamagata (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/525,764

(22) Filed: Mar. 14, 2000

(30) Foreign Application Priority Data

Mar. 16, 1999 (JP) .......................................... 11-071058

(51) Int. Cl.[7] .............................................. G11B 15/68
(52) U.S. Cl. ....................................................... 360/92
(58) Field of Search .............................. 360/92; 369/36, 369/34, 38

(56) References Cited

U.S. PATENT DOCUMENTS 6,160,678 A * 12/2000 Meikle et al. ................. 360/92
6,262,862 B1 * 7/2001 Kato et al. ..................... 360/92

FOREIGN PATENT DOCUMENTS

| JP | 61-255557 | 11/1986 |
|---|---|---|
| JP | 1-237953 | 9/1989 |
| JP | 3212852 | 9/1991 |
| JP | 3-241562 | 10/1991 |
| JP | 6-36435 | 2/1994 |
| JP | 8-127402 | 5/1996 |

* cited by examiner

Primary Examiner—Allen Cao
(74) Attorney, Agent, or Firm—Young & Thompson

(57) ABSTRACT

A picker mechanism for automatically taking a cartridge storing a recording medium into and out of a preselected position of a recording medium library includes a pair of fingers openable away from each other for gripping the cartridge therebetween. Basing members constantly bias the fingers toward a closed position. An opening member forces the fingers open against the action of the biasing members when moved forward to an advanced position. A solenoid for causes the opening member to move between a retracted position and the advanced position. The picker mechanism causes the fingers to open and close instantaneously and increases the gripping force of the fingers. In addition, the picker mechanism is simple and low cost.

6 Claims, 5 Drawing Sheets

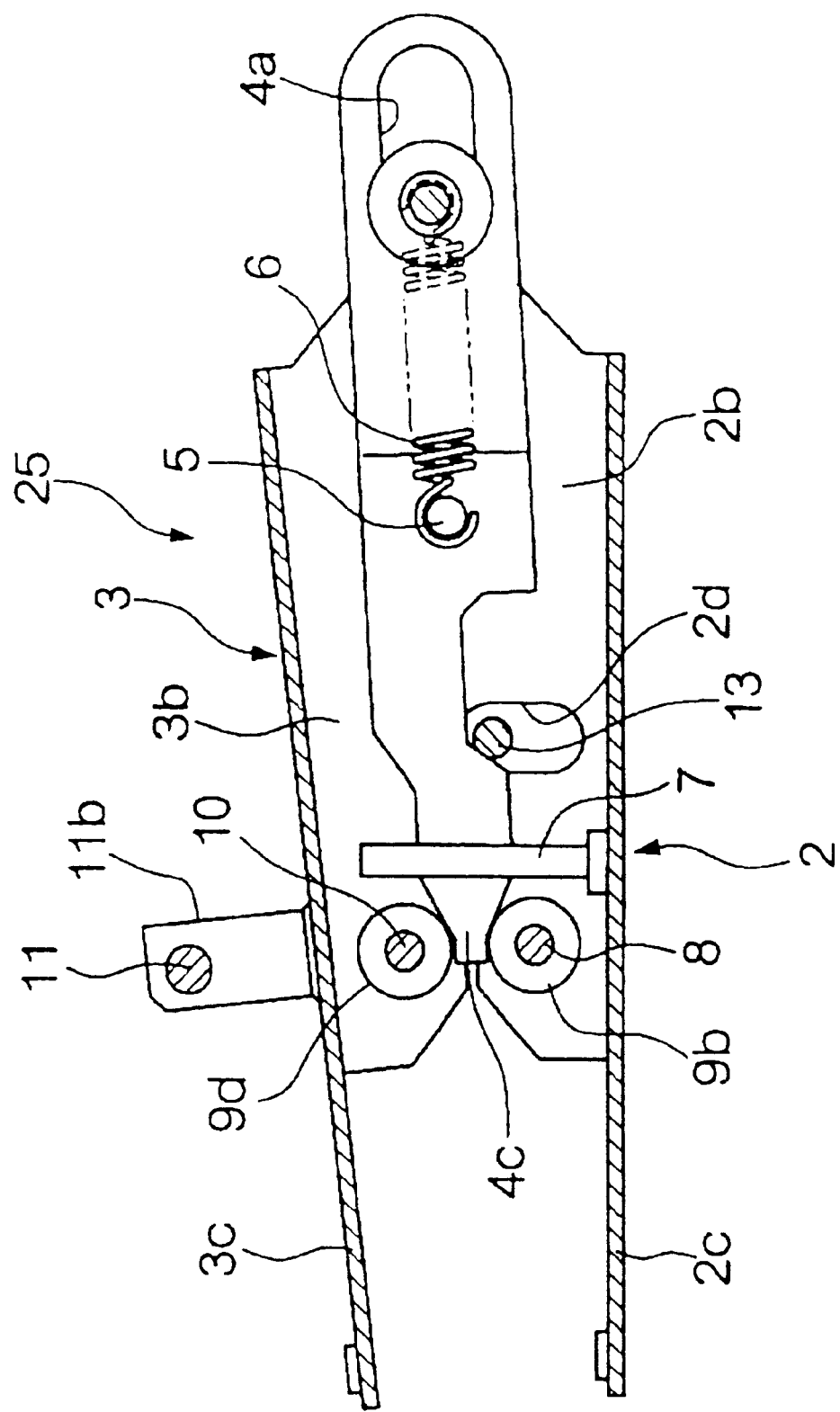

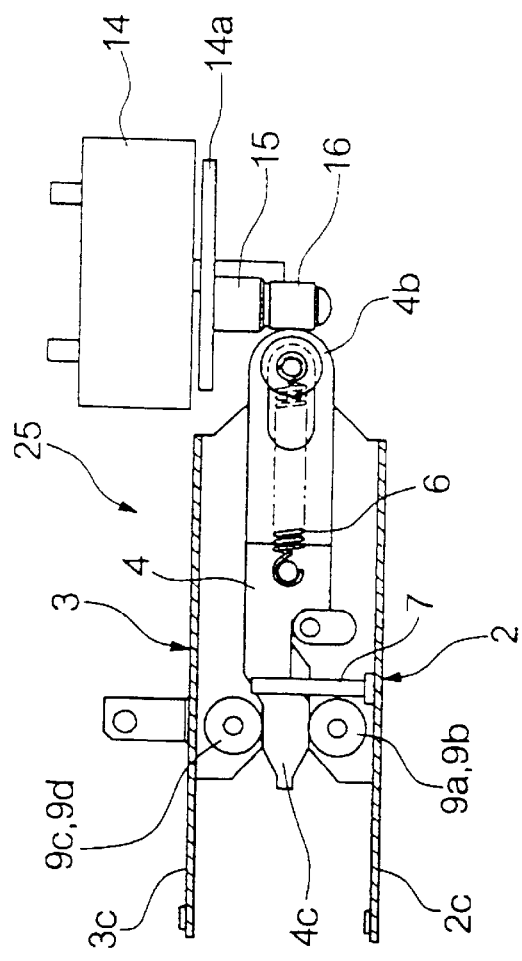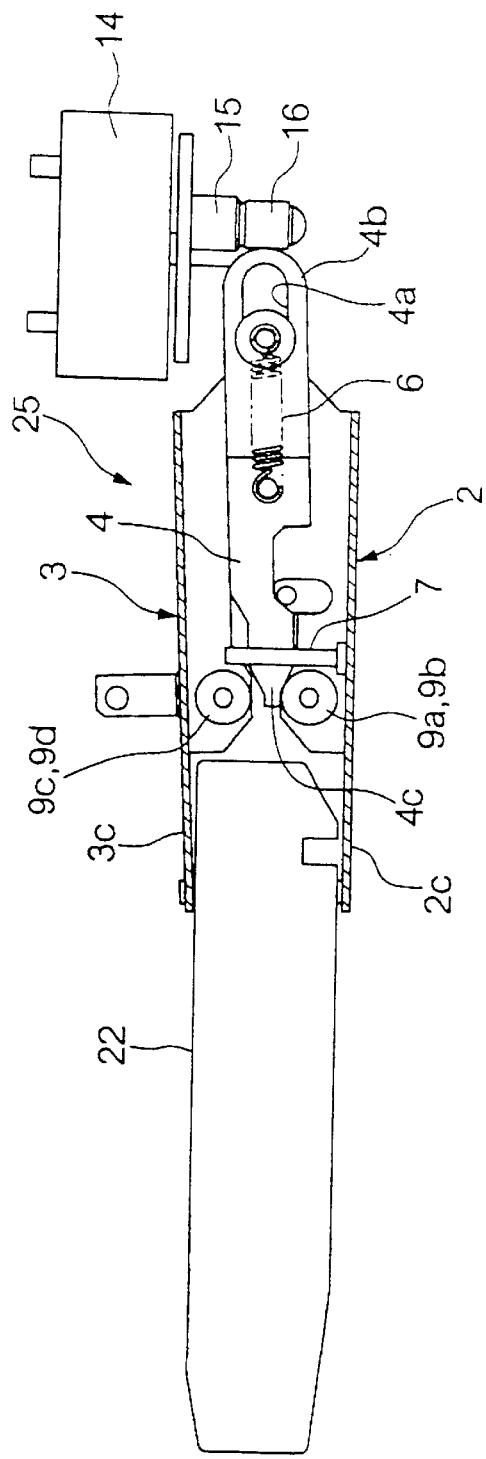

PICKER MECHANISM FOR A RECORDING MEDIUM LIBRARY

BACKGROUND OF THE INVENTION

The present invention relates to an accessor mechanism included in a recording medium library for conveying a cartridge between a rack or preselected position and a medium driver. More particularly, the present invention relates to a picker mechanism for picking up a cartridge located at the preselected position, conveying the cartridge to another preselected position, and then releasing the cartridge.

A recording medium library stores a number of optical disk cartridges, magnetic tape cartridges or similar data recording media and loads a drive unit thereof with designated one of the cartridges for a recording or reproducing purpose. A tape library, for example, includes an entry/exit device having cells arranged in the vertical and horizontal directions and an accessor device for picking up a magnetic tape cartridge stored in any one of the cells. When the operator of the library inserts a cartridge into the entry/exit device, a picker mechanism mounted on the accessor device senses the cartridge, picks up the cartridge, and then moves the cartridge to a preselected position.

In a disk library, an accessor device accesses one of optical disk cartridges stacked on a rack, picks up the cartridge, conveys the cartridge to a disk driver, loads the disk driver with the cartridge, and then returns the cartridge to the rack after recording or reproducing data in or out of the cartridge.

One of conventional picker mechanisms for the above accessor device includes a pair of fingers to which a pair of link members are pivotally mounted. A single drive motor selectively causes two cams to rotate. When the motor causes one of the cams to rotate, the cam causes the fingers to open and close via the link members. When the motor causes other cam to rotate, the cam causes the fingers to move back and forth via the link members. This kind of picker mechanism is disclosed in, e.g., Japanese Patent Laid-Open Publication No. 1-237953. The picker mechanism, however, must open and close the fingers or move them back and forth at accurate timing and therefore require the cams to have high accuracy and to be accurately mounted to the drive motor, resulting in an increase in cost.

Another conventional picker mechanism includes a pair of fingers each carrying a roller on its free end and caused to open and close by a drive motor, as taught in Japanese Patent Laid-Open Publication No. 6-36435 by way of example. The drive motor causes the rollers to close toward each other and thereby causes the fingers to grip a cartridge. Subsequently, another motor causes the rollers to rotate in order to pull in the cartridge. This picker mechanism opens and closes the fingers without reducing the rotation speed of the drive motor and therefore at high speed. However, the force of the fingers gripping a cartridge is weak and apt to cause the cartridge to slip out of the fingers.

Still another conventional picker mechanism includes a speed reduction mechanism intervening between a drive motor and a pair of fingers for guaranteeing a great torque, as proposed in Japanese Patent Laid-Open Publication No. 8-127402. The picker mechanism causes the fingers to open and close with such a torque. While this picker mechanism allows the fingers to firmly grip a cartridge, the speed reduction mechanism increases the number of parts and slows down the opening and closing actions of the fingers.

Technologies relating to the present invention are also disclosed i n, e.g., Japanese Patent Laid-Open Publication Nos. 61-255557 and 3-241562.

SUMMARY OF THE INVENTION

It is therefore an object of the present invention to provide a simple, low cost picker mechanism for a recording medium library capable of causing fingers thereof to open and close instantaneously and grip a cartridge with a sufficient force.

A picker mechanism for automatically taking a cartridge storing a recording medium into and out of a preselected position of a recording medium library of the present invention includes a pair of fingers openable away from each other for gripping the cartridge therebetween. Biasing members constantly bias the fingers toward a closed position. An opening member forces the fingers open against the action of the biasing members when moved forward to an advanced position. A solenoid causes the opening member to move between a retracted position and the advanced position.

BRIEF DESCRIPTION OF THE DRAWINGS

The above and other objects, features and advantages of the present invention will become more apparent from the following detailed description taken with the accompanying drawings in which:

FIG. 3 is a section along line III—III of FIG. 2B, showing the picker mechanism with the fingers held in a closed position;

FIG. 4A is a view showing the fingers held in the open position;

FIG. 4B is a view showing the fingers closed to grip a cartridge;

DESCRIPTION OF THE PREFERRED EMBODIMENT

Figure 1:
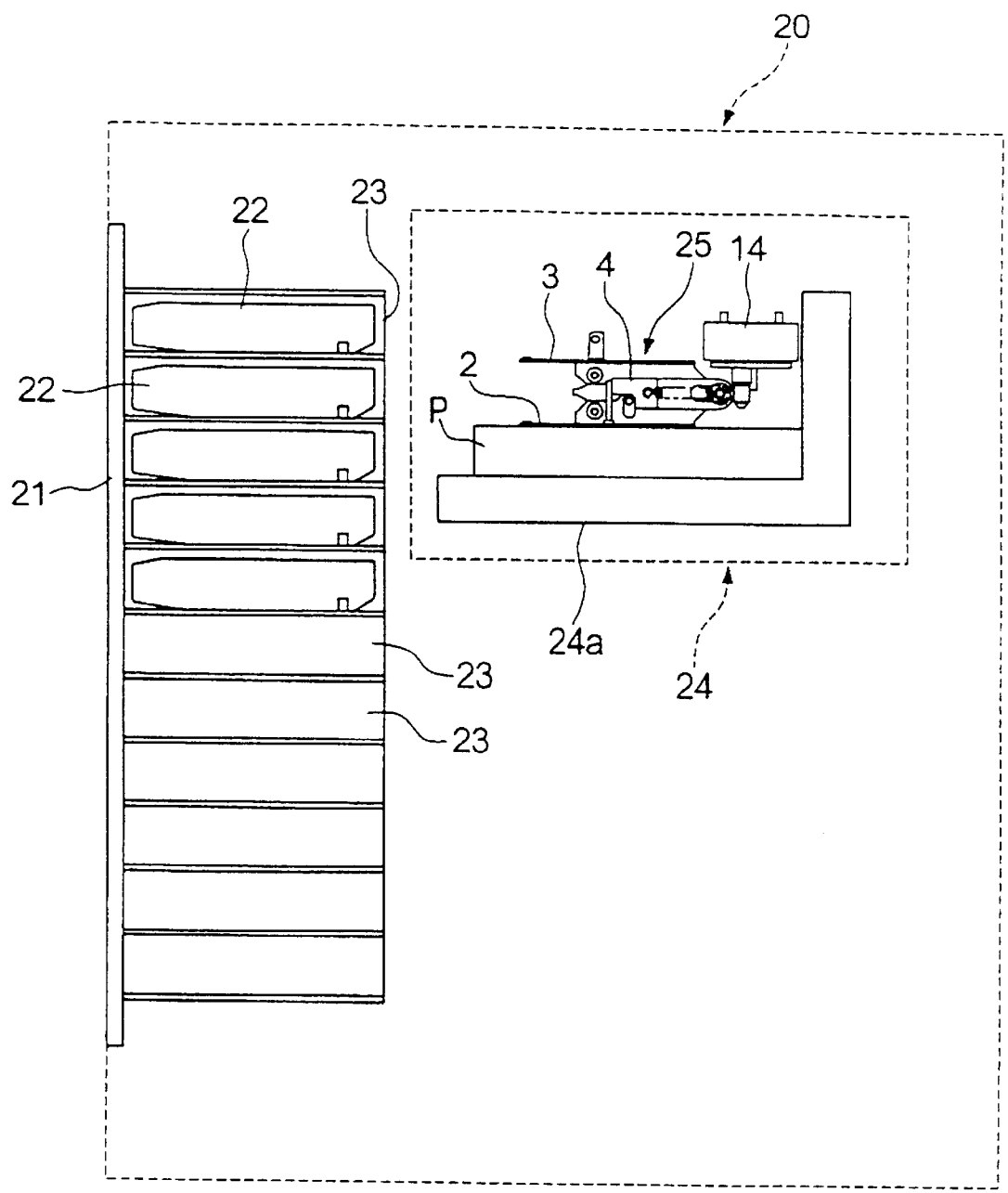
FIG. 1 is a fragmentary view showing a specific configuration of a recording medium library including a picker mechanism embodying the present invention.

Referring to FIG. 1 of the drawings, a picker mechanism for a recording medium library embodying the present invent ion is shown. Let a recording medium be implemented as a magnetic tape by way of example. As shown, the library, generally 20, includes an entry/exit device or rack 21. The entry/exit device 21 has a plurality of cells 23 each storing a particular cartridge 22 arranged in the vertical and horizontal directions. An accessor device 24 conveys designated one of the cartridges 22 between the entry/exit device 21 and a tape driver, not shown, that drives a magnetic tape, not shown, stored in the cartridge 22. The accessor device 24 includes an accessor base 24a loaded with a picker mechanism or hand mechanism 25. The picker mechanism 25 includes a picker base or body P and picks up the designated cartridge 22.

As shown in FIGS. 1, 2A through 2C and 3, the picker mechanism 25 includes an upper and a lower finger 3 and 2, a solenoid 14, and a block 4 in addition to the picker base P. The upper and lower fingers, or picker members, 3 and 2 are constantly biased by a pair of tension springs or biasing members 12 toward a closed position for gripping the designated cartridge 22. The solenoid 14 causes, when energized, the block 4 to move forward in order to open the fingers 2 and 3 away from each other. In this sense, the block 4 serves as an opening member.

More specifically, a mechanism for opening and closing the fingers 2 and 3 includes a horizontal first stationary shaft 1 journal led to the picker base P. The fingers 2 and 3 each are rotatably mounted on the stationary shaft 1 at one end or base end thereof. The fingers 2 and 3 respectively have sidewalls 2a and 2b and side walls 3a and 3b at opposite widthwise ends thereof. A horizontal lower shaft 8 is affixed to the sidewalls 2a and 2b of the finger 2 at opposite ends thereof. Pair of bearings 9a and 9b implemented as roller members are rollably mounted on the lower shaft 8, as will be described more specifically later. A horizontal upper shaft 10 is affixed to the sidewalls 3a and 3b of the other finger 3 at opposite ends thereof. Pair of bearings or roller members 9c and 9d are rollably mounted on the upper shaft 10, as will also be described more specifically later. The free end portions of the fingers 2 and 3 are labeled 2c and 3c, respectively.

A pair of brackets ha and lib protrude upward from the opposite widthwise ends of the top of the finger 3. A spring anchor shaft 11 is affixed to the brackets 11a and 11b at opposite ends thereof. The previously mentioned tension springs 12 each are anchored to one end of the spring anchor shaft 11 and the end of the lower shaft 8 corresponding to the end of the shaft 11, constantly biasing the fingers 2 and 3 toward the closed position. The block or opening member 4 is positioned between the fingers 2 and 3 in such a manner as to have its base end 4b inserted between the fingers 2 and 3.

A slot 4a is formed in the base end 4b of the block 4 and elongate in the front-and-rear direction of the block 4 while the first stationary shaft 1 extends throughout the slot 4a. In this configuration, the block 4 is movable back and forth by a distance corresponding to the length of the slot 4a relative to the first stationary shaft 1 and rotatable about the shaft 1. A shaft 5 is affixed to substantially the intermediate portion of the block 4. A pair of tension springs 6 are constantly biasing the block 4 rearward, or rightward as viewed in FIG. 3, to a retracted position or stand-by position where the front edge of the slot 4a abuts against the shaft 1. A pair of studs 7 are studded on the finger 2 and guide the opposite widthwise ends of the block 4 to thereby prevent the free end of the block 4 from shaking.

FIG. 4A shows a condition wherein the fingers 2 and 3 are opened away form each other. As shown, the free end of the block 4 is held between the bearings 9a and 9b of the lower shaft 8 and the bearings 9c and 9d of the upper shaft 10 by the action of the tension springs 12.

Figure 2A:
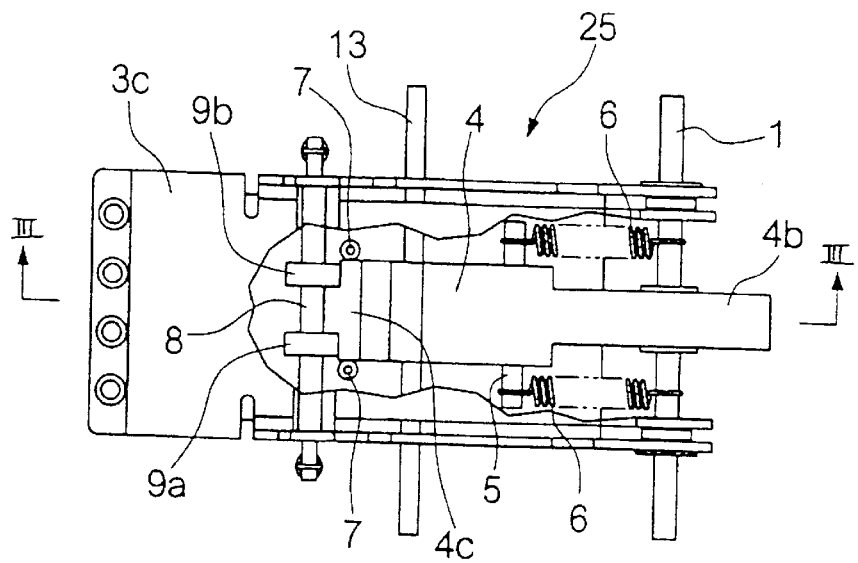
FIG. 2A is a plan view showing the picker mechanism with a pair of fingers thereof held in an open position.
Figure 2B:
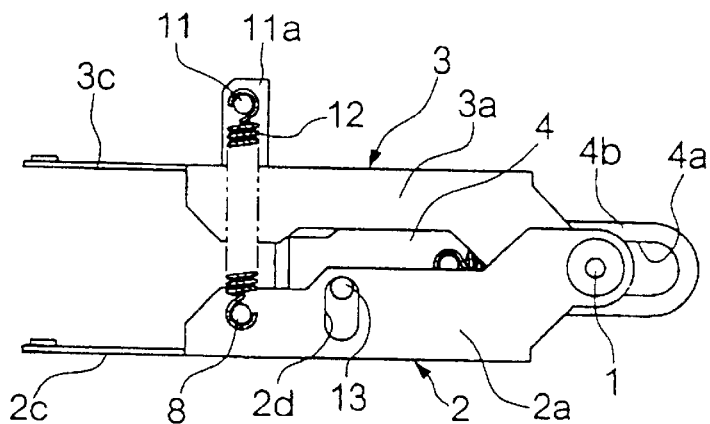
FIG. 2B is a front view of the picker mechanism.
Figure 2C:
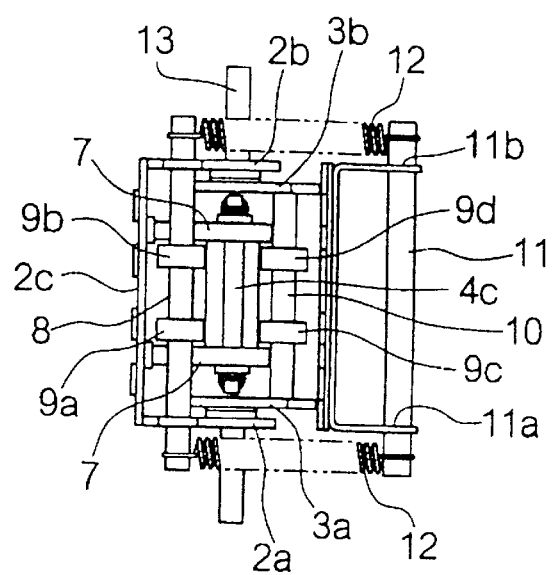
FIG. 2C is a side elevation of the picker mechanism.

A second stationary shaft 13 is affixed to the picker base P and extends throughout vertical elongate slots 2d (only one is shown in FIG. 2B) formed in the sidewalls 2a and 2b of the lower finger 2. In this condition, the second stationary shaft 13 constantly sustains the finger 2 and thereby determines the level or height of the finger 2 while maintaining the finger 2 horizontal. The shaft 13 therefore plays the role of a height determining member.

As shown in FIG. 3, when the block 4 is held in the retracted position, the fingers 2 and 3 are held in their closed position. In this condition, the bearings 9a and 9b and bearings 9c and 9d contact the tapered end 4c of the block 4. When the block 4 is moved forward away from the retracted position, it increases the distance between the bearings 9a and 9c and the bearings 9b and 9d with the tapered end 4c.

Figure 5A:
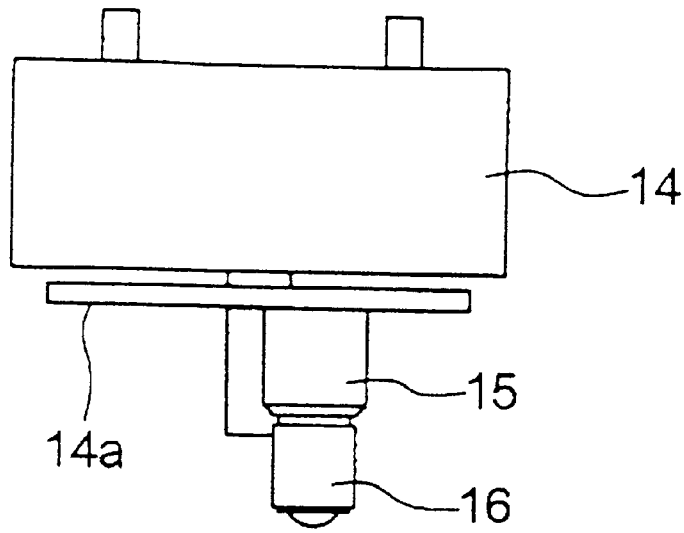
FIG. 5A is a front view of a solenoid included in the illustrative embodiment.
Figure 5B:
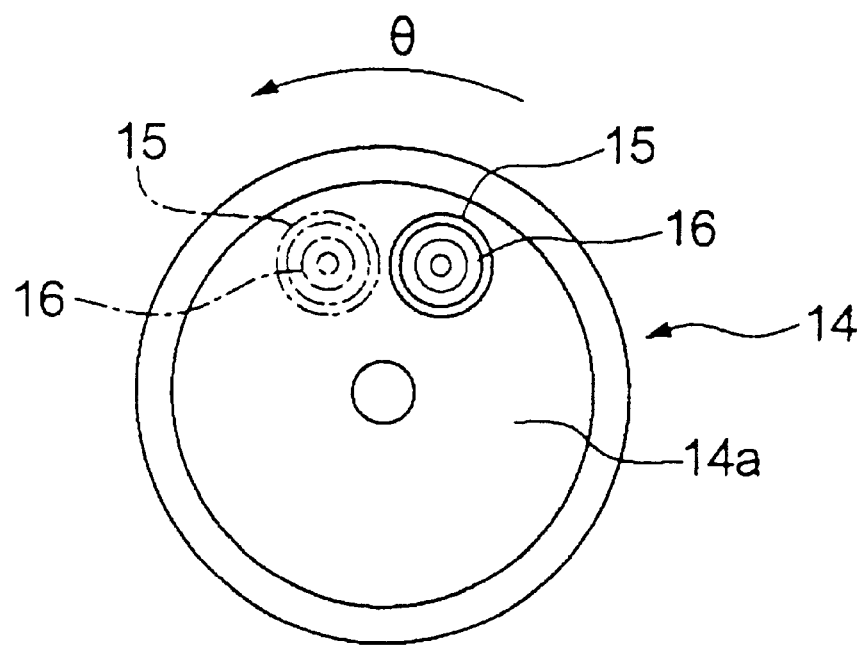
FIG. 5B is a bottom view of the solenoid.

The solenoid 14 for moving the block 4 will be described specifically with reference to FIGS. 5A and 5B. The solenoid 14 is affixed to the picker base P, FIG. 1. As shown, the solenoid 14 includes a plate 14a rotatable by a preselected angle θ. A stud 15 is studded on the plate 14a. A collar 16 is coaxially mounted on the stud 15 and rotatable about the axis of the stud 15.

When the solenoid 14 is energized, it causes the plate 14a to rotate by the preselected angle θ. As a result, the stud 15 is moved from an inoperative position indicated by a solid line in FIG. 5B to an operative position indicated by a phantom line in FIG. 5B toward the block 4. As a result, the block 4 is moved from the retracted position to an advanced position, causing the fingers 2 and 3 to open away from each other. More specifically, when the solenoid 14 is energized, it causes the collar 16 coaxial with the stud 15 to force the block 4 to the advanced position. At this instant, the block 4 moves the bearings 9a and 9b and bearings 9c and 9d and therefor the fingers 2 and 3 away from each other. When the solenoid 14 is deenergized, the block 4 is pulled by the tension springs 6 to its retracted position with the result that the fingers 2 and 3 are again closed. In this manner, the illustrative embodiment causes the fingers 2 and 3 to open and close instantaneously with a simple mechanism including the solenoid 14 and block 4. The rotary solenoid 14 may be replaced with a conventional push-pull type solenoid, if desired.

A specific operation of the magnetic tape library 20, particularly the picker mechanism 25, will be described hereinafter. As shown in FIG. 1, the operator of the library 20 inserts one magnetic tape cartridge 22 into preselected one of the cells 23 of the entry/exit mechanism 21. In response, the accessor device 24 is moved to pick up the cartridge 22 inserted into the entry/exit mechanism 21. For example, the accessor device 24 is brought to the uppermost cell 23 and determines whether or not the cartridge 22 is present there with a sensor not shown. If the cartridge 22 is present in the above cell 23, the accessor device 24 tries to pick up the cartridge 22. At this instant, the fingers 2 and 3 of the picker mechanism 25 are still held in the closed position shown in FIG. 3.

As shown in FIG. 4A, when the solenoid 14 is energized, the plate 14a and therefore the stud 15 rotates. The collar 16 coaxial stud 15 presses the block 4 to the advanced position. At this time, the tapered end 4c of the block 4 forces the fingers 2 and 3 open while causing the bearings 9a and 9b and bearings 9c and 9d to roll by friction. More specifically, the lower bearings 9a and 9b do not move in the up-and-down direction, so that the block 4 angularly moves slightly upward. A moving mechanism, not shown, causes the picker mechanism 25 to move forward relative to the accessor base 24a, FIG. 1, until the cartridge 22 has been positioned between the ends 2c and 3c of the fingers 2 and 3. Subsequently, the solenoid 14 is deenergized with the result that the block 4 is pulled rearward by the action of the tension springs 6, as shown in FIG. 4B. At this instant, the finger 3 moves slightly downward. Consequently, the fingers 2 and 3 grip the cartridge 22 with their ends 2c and 3c. Because the upper bearings 9c and 9d are spaced from the block 4, the bias of the tension springs 12 allows the fingers 2 and 3 to grip the cartridge 22.

Subsequently, the moving mechanism moves the picker mechanism 25 rearward along the accessor base 24a, FIG. 1, and thereby causes it to pull the cartridge 22 out of the cell 22. The accessor mechanism 24 then conveys the picker mechanism 25 to the tape driver and causes the picker mechanism 25 to hand over the cartridge 22 to the tape driver. After data have been written to or read out of the tape stored in the cartridge 22, the picker mechanism 25 again grips the cartridge 22. Thereafter, the accessor device 24 returns to the entry/exit device 21 and causes the picker mechanism 25 to return the cartridge 22 to the cell 23.

As stated above, the illustrative embodiment is capable of opening and closing the fingers 2 and 3 instantaneously by driving the solenoid 14. The gripping force of the fingers 2 and 3 to act on the cartridge 22 can be freely set on the basis of the bias of the tension springs 12. In addition, the illustrative embodiment does not need the conventional speed reduction mechanism, which would increase the number of parts, while achieving high durability.

Further, the block 4 forces the fingers 2 and 3 open via the bearings 9a through 9d that roll in accordance with the movement of the block 4. This successfully reduces frictional resistance to act between the block 4 and the fingers 2 and 3 and thereby protects them from wear, while allowing a small force to move the block 4 smoothly and easily.

While one of the horizontal fingers 2 and 3 has been shown and describing as moving relative to the other, both of them may move relative to each other, if desired.

In summary, it will be seen that the present invention provides a picker mechanism for a recording medium library having various unprecedented advantages, as follows. A solenoid causes a pair of fingers to open and close instantaneously and allows the fingers to exert any desired degree of gripping force on a cartridge. In addition, the picker mechanism obviates the need for a speed reduction mechanism and thereby reduces the number of parts, while achieving high durability.

Moreover, an opening member forces the fingers open via bearings that roll in accordance with the movement of the forcing member. This successfully reduces frictional resistance to act between the opening member and the fingers and thereby protects them from wear, while al lowing a small force to move the opening member smoothly and easily.

Various modifications will become possible for those ski l ed in the art after receiving the teachings of the present disclosure without departing from the scope thereof.

What is claimed is:

1. A picker mechanism for moving a cartridge in a recording medium library, said picker mechanism comprising:

first and second fingers for gripping a cartridge therebetween in a closed position, at least one of said first and second fingers being openable away from another one of said first and second fingers to an open position;

at least one biasing member for constantly biasing at least one of said first and second fingers toward said closed position;

an opening member having first and second ends, the first end being tapered and pushing at least one of said first and second fingers to the open position against an action of said at least one biasing member when said opening member is inserted between said first and second fingers; and a solenoid that inserts said opening member between said first and second fingers.

2. The picker mechanism as claimed in claim 1, wherein said second end has an elongated slot for slidably receiving a first shaft, said first and second fingers being pivotally connected to said first shaft.

3. A picker mechanism as claimed in claim 2, further comprising a second biasing member that urges said opening member to a retracted position defined by an end of said slot.

4. The picker mechanism as claimed in claim 1, wherein said solenoid directly contacts said second end.

5. The picker mechanism as claimed in claim 1, wherein each of said first and second fingers comprises at least one bearing, said opening member contacting said at least one bearing when said opening member is inserted between said first and second fingers.

6. The picker mechanism as claimed in claim 1, further comprising a distance defining member that extends through a slot in one of said first and second fingers for defining a distance traveled by said one of said first and second fingers between said closed position and said open position.

* * * * *